US 11,749,415 B2

(12) United States Patent
Mills (10) Patent No.: US 11,749,415 B2
(45) Date of Patent: *Sep. 5, 2023

(54) THERMOPHOTOVOLTAIC ELECTRICAL POWER GENERATOR NETWORK

(71) Applicant: Brilliant Light Power, Inc., Cranbury, NJ (US)

(72) Inventor: Randell L. Mills, Yardley, PA (US)

(73) Assignee: Brilliant Light Power, Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/483,646

(22) Filed: Sep. 23, 2021

(65) Prior Publication Data

US 2022/0020506 A1 Jan. 20, 2022

Related U.S. Application Data

(62) Division of application No. 16/305,448, filed as application No. PCT/US2017/035025 on May 30, 2017, now Pat. No. 11,158,430.

(60) Provisional application No. 62/343,092, filed on May 30, 2016.

(51) Int. Cl.
*G21B 3/00* (2006.01)
*G21D 7/00* (2006.01)
*H04B 3/54* (2006.01)

(52) U.S. Cl.
CPC .............. *G21B 3/004* (2013.01); *G21D 7/00* (2013.01); *H04B 3/54* (2013.01)

(58) Field of Classification Search
CPC ... H04B 3/54; G21B 1/05; G21B 1/17; G21B 3/004
USPC .......................................... 307/149, 150, 151
See application file for complete search history.

(56) References Cited

U.S. PATENT DOCUMENTS

| 4,603,043 | A | 7/1986 | Douglas et al. | |
| 7,224,272 | B2* | 5/2007 | White, II | H04B 3/58 340/310.17 |
| 7,559,494 | B1 | 7/2009 | Yadav et al. | |
| 10,443,139 | B2 | 10/2019 | Mills | |
| 10,753,275 | B2 | 8/2020 | Mills | |
| 11,158,430 | B2* | 10/2021 | Mills | G21B 3/00 |
| 2002/0150694 | A1 | 10/2002 | Ye et al. | |

(Continued)

FOREIGN PATENT DOCUMENTS

WO   2015075566 A1   5/2015
WO   20150134047 A1   9/2015

(Continued)

OTHER PUBLICATIONS

International Search Report and Written Opinion for corresponding PCT Patent Application PCT/US2017/035025, dated Aug. 8, 2017 (10 pages).

(Continued)

*Primary Examiner* — Hai L Nguyen
(74) *Attorney, Agent, or Firm* — Greenberg Traurig, LLP; Jonathan D. Ball (57) ABSTRACT

A distributed information between plasma based power generating devices which provide at least one of electrical and thermal power and a portal for transmission of information and methods of operating such a network is disclosed. The network may include a plurality of power systems that are organized and controlled to form a communication network.

18 Claims, 2 Drawing Sheets

(56) References Cited

U.S. PATENT DOCUMENTS

| | | |
|---|---|---|
| 2005/0031870 A1 | 2/2005 | Liu et al. |
| 2005/0168326 A1 | 8/2005 | White et al. |
| 2007/0041897 A1 | 2/2007 | Eickhoff et al. |
| 2016/0290223 A1 | 10/2016 | Mills |
| 2017/0070180 A1 | 3/2017 | Mills |
| 2017/0104426 A1 | 4/2017 | Mills |
| 2018/0159459 A1 | 6/2018 | Mills |
| 2019/0372449 A1 | 12/2019 | Mills |
| 2020/0002828 A1 | 1/2020 | Mills |
| 2020/0366180 A1 | 11/2020 | Mills |
| 2020/0403555 A1 | 12/2020 | Mills |

FOREIGN PATENT DOCUMENTS

| | | |
|---|---|---|
| WO | 2015184252 A1 | 12/2015 |
| WO | 201701274477 A1 | 7/2017 |
| WO | 20170210204 A1 | 12/2017 |
| WO | 20180203953 A2 | 11/2018 |
| WO | 20180222569 A1 | 12/2018 |
| WO | 2019011164 A1 | 6/2019 |

OTHER PUBLICATIONS

Translation of Office Action for corresponding Taiwant Patent Application No. 106117762, dated Jul. 14, 2020 (5 pages).

Barkhordarian et al. "Catalytic Mechanism of Transition-Metal Compounds on Mg Hydrogen Sorption Reaction," J. Phys. Chem. B, vol. 110, (2006): 11020-11024.

Santjojo et al., "Ellipsometric characterization on multi-layered thin film systems during hydrogenation," Materials Transactions, vol. 48, No. 6 (2007): 1380-1386.

Watkins et al. "Reaction of Alkali Metal hydrides with Zinc Halides with Zinc Halides in Tetrahydrofuran. A Convenient and Economical Preparation of Zinc Hydride," Inorganic Chemistry, vol. 13, No. 10, (1974): 2350-2354.

Wu et al. "Effect of carbon/noncarbon addition on hydrogen storage behaviors of magnesium hydride," Journal of Alloys and Compounds, 414 (2006) 259-264.

\* cited by examiner

THERMOPHOTOVOLTAIC ELECTRICAL POWER GENERATOR NETWORK

CROSS REFERENCE TO RELATED APPLICATIONS

This application claims priority to and is a divisional of U.S. application Ser. No. 16/305,448 filed Nov. 29, 2018, now U.S. Pat. No. 11,158,430, which issued on Oct. 26, 2021, which is the US National Stage Entry of Int'l. App. No. PCT/US2017/035028, filed May 30, 2017, which claims priority to and the benefit of U.S. App. No. 63/343,092, each of which are hereby incorporated by reference in their entirety.

The present disclosure relates to the field of power generation and, in particular, to systems, devices, and methods for the generation of power, and a communication system for at least one of remote monitoring, remote control, and remote communication with and between power generators wherein each generation system comprises a communication device and the device capable of remote communication may be organized to form a communication network. The network may comprise at least two communication devices capable of sending and receiving signals between each power generator, and the network may comprise a system to communicate between a plurality of the generation system communication devices. The network may comprise at least one of a mesh network, a fully connected network an ad-hoc network, a mobile ad hoc network (MANETs), self healing algorithms such a shortest path bridging, a wireless mesh network. In an embodiment, the mesh network can relay messages using either a flooding or a routing technique. In an embodiment, the flooding technique such as uncontrolled flooding and controlled flooding comprises a routing algorithm wherein every incoming packet is sent through every outgoing link except the one that it arrived on or the one that transmitted it.

A controlled flooding embodiment may comprise at least one of two algorithms to make it reliable, such as one comprising sequence number controlled flooding (SNCF) and reverse path flooding (RPF). In the SNCF embodiment, the node may attach its own address and sequence number to the information packet that is transmitted wherein every node has a memory of addresses and sequence numbers. If the node receives a packet in memory, it may drop it immediately. In the RPF embodiment, the node may only send the packet forward, and if it is received from the next node, it may send it back to the sender. Flooding may be used in bridging. In an embodiment, the routing technique comprises a routing algorithm wherein the message is transmitted along a path by hopping from node to node to reach its destination address.

Basic computer networks include servers, clients, transmission media, data, and network interfaces. Distributed networks can also include hubs and/or routers. In a distributed network, client devices connect to each other and servers over transmission media to share data and other information. In some examples, transmission media can be wires, and in other examples, transmission media can be radio frequency transmission. Each client and server has a network interface enabling it to connect to the network. The network interface physically connects to the network and passes data between the client or server and the network.

In some network configurations, clients and servers operate in a local network. Local networks interconnect devices within a limited area such as a residence, school, laboratory, or office building. Local networks can communicate with other local networks through transmission media connections between the networks (e.g., network access points). Routers and/or hubs can be used to route data within and between local networks.

More specifically, embodiments of the present disclosure are directed to power generation devices and systems, as well as related methods, which produce optical power, plasma, and thermal power and produces electrical power via an optical to electric power converter, plasma to electric power converter, photon to electric power converter, or a thermal to electric power converter, and each power system further comprises communication device to receive and send signals to other remote communications devices that may form a communication network. In addition, embodiments of the present disclosure describe systems, devices, and methods that use the ignition of a water or water-based fuel source to generate optical power, mechanical power, electrical power, and/or thermal power using photovoltaic power converters. These and other related embodiments are described in detail in the present disclosure.

Power generation can take many forms, harnessing the power from plasma. Successful commercialization of plasma may depend on power generation systems capable of efficiently forming plasma and then capturing the power of the plasma produced.

Plasma may be formed during ignition of certain fuels. These fuels can include water or water-based fuel source. During ignition, a plasma cloud of electron-stripped atoms is formed, and high optical power may be released. The high optical power of the plasma can be harnessed by an electric converter of the present disclosure. The ions and excited state atoms can recombine and undergo electronic relaxation to emit optical power. The optical power can be converted to electricity with photovoltaics.

Certain embodiments of the present disclosure are directed to a power generation system comprising: a plurality of electrodes configured to deliver power to a fuel to ignite the fuel and produce a plasma; a source of electrical power configured to deliver electrical energy to the plurality of electrodes; and at least one photovoltaic power converter positioned to receive at least a plurality of plasma photons.

In one embodiment, the present disclosure is directed to a power system and a communication network of power systems that generates at least one of electrical energy and thermal energy and sends and receives information comprising:

at least one vessel capable of a maintaining a pressure of below, at, or above atmospheric;

reactants, the reactants comprising:
 a) at least one source of catalyst or a catalyst comprising nascent $H_2O$;
 b) at least one source of $H_2O$ or $H_2O$;
 c) at least one source of atomic hydrogen or atomic hydrogen; and
 d) a molten metal;

at least one molten metal injection system comprising a molten metal reservoir and an electromagnetic pump;

at least one additional reactants injection system, wherein the additional reactants comprise:
 a) at least one source of catalyst or a catalyst comprising nascent $H_2O$;
 b) at least one source of $H_2O$ or $H_2O$, and
 c) at least one source of atomic hydrogen or atomic hydrogen;

at least one reactants ignition system comprising a source of electrical power, wherein the source of electrical power receives electrical power from the power converter, a system to recover the molten metal; and at least one power converter or output system of at least one of the light and thermal output to electrical power and/or thermal power.

In an embodiment, the molten metal ignition system comprises:
a) at least one set of electrodes to confine the molten metal; and
b) a source of electrical power to deliver a short burst of high-current electrical energy sufficient to cause the reactants to react to form plasma.

The electrodes may comprise a refractory metal.

In an embodiment, the source of electrical power that delivers a short burst of high-current electrical energy sufficient to cause the reactants to react to form plasma comprises at least one supercapacitor.

The molten metal injection system may comprise an electromagnetic pump comprising at least one magnet providing a magnetic field and current source to provide a vector-crossed current component.

The molten metal reservoir may comprise an inductively coupled heater.

The molten metal ignition system may comprise at least one set of electrodes that are separated to form an open circuit, wherein the open circuit is closed by the injection of the molten metal to cause the high current to flow to achieve ignition.

The molten metal ignition system current may be in the range of 500 A to 50,000 A.

The circuit of the molten metal ignition system may be closed by metal injection to cause an ignition frequency in the range of 1 Hz to 10,000 Hz, wherein the molten metal comprises at least one of silver, silver-copper alloy, and copper and the addition reactants may comprise at least one of $H_2O$ vapor and hydrogen gas.

In an embodiment, the additional reactants injection system may comprise at least one of a computer, $H_2O$ and $H_2$ pressure sensors, and flow controllers comprising at least one or more of the group of a mass flow controller, a pump, a syringe pump, and a high precision electronically controllable valve; the valve comprising at least one of a needle valve, proportional electronic valve, and stepper motor valve wherein the valve is controlled by the pressure sensor and the computer to maintain at least one of the $H_2O$ and $H_2$ pressure at a desired value.

The additional reactants injection system may maintain the $H_2O$ vapor pressure in the range of 0.1 Torr to 1 Torr.

In an embodiment, the system to recover the products of the reactants comprises at least one of the vessel comprising walls capable of providing flow to the melt under gravity, an electrode electromagnetic pump, and the reservoir in communication with the vessel and further comprising a cooling system to maintain the reservoir at a lower temperature than another portion of the vessel to cause metal vapor of the molten metal to condense in the reservoir wherein the recovery system may comprise an electrode electromagnetic pump comprising at least one magnet providing a magnetic field and a vector-crossed ignition current component.

In an embodiment, the power system comprises a vessel capable of a maintaining a pressure of below, at, or above atmospheric comprising an inner reaction cell, a top cover comprising a blackbody radiator, and an outer chamber capable of maintaining the a pressure of below, at, or above atmospheric, wherein the top cover comprising a blackbody radiator is maintained at a temperature in the range of 1000 K to 3700 K, and wherein at least one of the inner reaction cell and top cover comprising a blackbody radiator comprises a refractory metal having a high emissivity.

The power system may comprise at least one power converter of the reaction power output comprising at least one of the group of a thermophotovoltaic converter, a photovoltaic converter, a photoelectronic converter, a plasmadynamic converter, a thermionic converter, a thermoelectric converter, a Sterling engine, a Brayton cycle engine, a Rankine cycle engine, and a heat engine, and a heater.

In an embodiment, the light emitted by the cell is predominantly blackbody radiation comprising visible and near infrared light, and the photovoltaic cells are concentrator cells that comprise at least one compound chosen from perovskite, crystalline silicon, germanium, gallium arsenide (GaAs), gallium antimonide (GaSb), indium gallium arsenide (InGaAs), indium gallium arsenide antimonide (InGaAsSb), indium phosphide arsenide antimonide (InPAsSb), InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga(In)As/InGaAs; GaInP—GaAs-wafer-InGaAs; GaInP—Ga(In)As—Ge; and GaInP—GaInAs—Ge.

In an embodiment, the light emitted by the cell is predominantly ultraviolet light, and the photovoltaic cells are concentrator cells that comprise at least one compound chosen from a Group III nitride, GaN, AlN, GaAlN, and InGaN.

The power system may further comprise a vacuum pump and at least one chiller.

In an embodiment, the power system further comprises a device capable of remote communication wherein the device may be further capable of comprising a communication element of a plurality of communication elements of a plurality of power systems that are organized and controlled to form a communication network.

The communication devices may at least one of remotely monitor the power system, remotely control the power system, remotely send data such as power system performance and operating parameters, and send and receive general information such as email, video, audio, and internet communication.

In one embodiment, the present disclosure is directed to a power system and a communication network of power systems that generates at least one of electrical energy and thermal energy and sends and receives information comprising:

at least one vessel capable of a maintaining a pressure of below, at, or above atmospheric;
reactants, the reactants comprising:
a) at least one source of catalyst or a catalyst comprising nascent $H_2O$;
b) at least one source of $H_2O$ or $H_2O$;
c) at least one source of atomic hydrogen or atomic hydrogen; and
d) a molten metal;
at least one molten metal injection system comprising a molten metal reservoir and an electromagnetic pump;
at least one additional reactants injection system, wherein the additional reactants comprise:
a) at least one source of catalyst or a catalyst comprising nascent $H_2O$;
b) at least one source of $H_2O$ or $H_2O$, and
c) at least one source of atomic hydrogen or atomic hydrogen;

at least one reactants ignition system comprising a source of electrical power to cause the reactants to form at least one of light-emitting plasma and thermal-emitting plasma wherein the source of electrical power receives electrical power from the power converter;

a system to recover the molten metal;

at least one power converter or output system of at least one of the light and thermal output to electrical power and/or thermal power;

wherein the molten metal ignition system comprises:
a) at least one set of electrodes to confine the molten metal; and
b) a source of electrical power to deliver a short burst of high-current electrical energy sufficient to cause the reactants to react to form plasma;

wherein the electrodes comprise a refractory metal;

wherein the source of electrical power to deliver a short burst of high-current electrical energy sufficient to cause the reactants to react to form plasma comprises at least one supercapacitor;

wherein the molten metal injection system comprises an electromagnetic pump comprising at least one magnet providing a magnetic field and current source to provide a vector-crossed current component;

wherein the molten metal reservoir comprises an inductively coupled heater, wherein the molten metal ignition system comprises at least one set of electrodes that are separated to form an open circuit, wherein the open circuit is closed by the injection of the molten metal to cause the high current to flow to achieve ignition;

wherein the molten metal ignition system current is in the range of 500 A to 50,000 A;

wherein the molten metal ignition system wherein the circuit is closed to cause an ignition frequency in the range of 1 Hz to 10,000 Hz;

wherein the molten metal comprises at least one of silver, silver-copper alloy, and copper;

wherein the addition reactants comprise at least one of $H_2O$ vapor and hydrogen gas;

wherein the additional reactants injection system comprises at least one of a computer, $H_2O$ and $H_2$ pressure sensors, and flow controllers comprising at least one or more of the group of a mass flow controller, a pump, a syringe pump, and a high precision electronically controllable valve; the valve comprising at least one of a needle valve, proportional electronic valve, and stepper motor valve wherein the valve is controlled by the pressure sensor and the computer to maintain at least one of the $H_2O$ and $H_2$ pressure at a desired value;

wherein the additional reactants injection system maintains the $H_2O$ vapor pressure in the range of 0.1 Torr to 1 Torr;

wherein the system to recover the products of the reactants comprises at least one of the vessel comprising walls capable of providing flow to the melt under gravity, an electrode electromagnetic pump, and the reservoir in communication with the vessel and further comprising a cooling system to maintain the reservoir at a lower temperature than another portion of the vessel to cause metal vapor of the molten metal to condense in the reservoir;

wherein the recovery system comprising an electrode electromagnetic pump comprises at least one magnet providing a magnetic field and a vector-crossed ignition current component;

wherein the vessel capable of a maintaining a pressure of below, at, or above atmospheric comprises an inner reaction cell, a top cover comprising a blackbody radiator, and an outer chamber capable of maintaining the a pressure of below, at, or above atmospheric;

wherein the top cover comprising a blackbody radiator is maintained at a temperature in the range of 1000 K to 3700 K;

wherein at least one of the inner reaction cell and top cover comprising a blackbody radiator comprises a refractory metal having a high emissivity;

wherein the blackbody radiator further comprises a blackbody temperature sensor and controller;

wherein the at least one power converter of the reaction power output comprises at least one of the group of a thermophotovoltaic converter and a photovoltaic converter;

wherein the light emitted by the cell is predominantly blackbody radiation comprising visible and near infrared light, and the photovoltaic cells are concentrator cells that comprise at least one compound chosen from crystalline silicon, germanium, gallium arsenide (GaAs), gallium antimonide (GaSb), indium gallium arsenide (InGaAs), indium gallium arsenide antimonide (InGaAsSb), and indium phosphide arsenide antimonide (InPAsSb), Group III/V semiconductors, InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga(In)As/InGaAs; GaInP—GaAs-wafer-InGaAs; GaInP—Ga(In)As—Ge; and GaInP—GaInAs—Ge, and wherein the power system further comprises a vacuum pump and at least one chiller.

In an embodiment, the power system further comprises a device capable of remote communication wherein the device may be further capable of comprising a communication element of a plurality of communication elements of a plurality of power systems that are organized and controlled to form a communication network.

The communication devices may at least one of remotely monitor the power system, remotely control the power system, remotely send data such as power system performance and operating parameters, and send and receive general information such as email, video, audio, and internet communication.

The accompanying drawings, which are incorporated in and constitute a part of this specification, illustrate several embodiments of the disclosure and together with the description, serve to explain the principles of the disclosure. In the drawings.

Atomic hydrogen is predicted to form fractional Rydberg energy states H(1/p) called "hydrino atoms" wherein $$n = \frac{1}{2}, \frac{1}{3}, \frac{1}{4}, \cdots, \frac{1}{p}$$

(p≤137 is an integer) replaces the well-known parameter n=integer in the Rydberg equation for hydrogen excited states. The transition of H to a stable hydrino state $$H\left(\frac{a_H}{p=m+1}\right)$$

having a binding energy of $p^2$ 13.6 eV occurs by a nonradiative resonance energy transfer of m 27.2 eV (m is an integer) to a matched energy acceptor. The nascent $H_2O$ molecule (not hydrogen bonded in solid, liquid, or gaseous state) may serve as a catalyst by accepting 81.6 eV (m=3) to form an intermediate that decays with the emission of a continuum band with a short wavelength cutoff of 10.1 nm and energy of 122.4 eV corresponding to a total energy release of 204 eV per H. The resulting H(¼) may subsequently serve as a catalyst for the transition of another H in the reaction mixture to H(1/17) releasing 3712.8 eV such that hundred of thousands of watts of power may be developed from hundreds of micromoles of $H_2$ per second flowed into the reaction.

Figure 1:
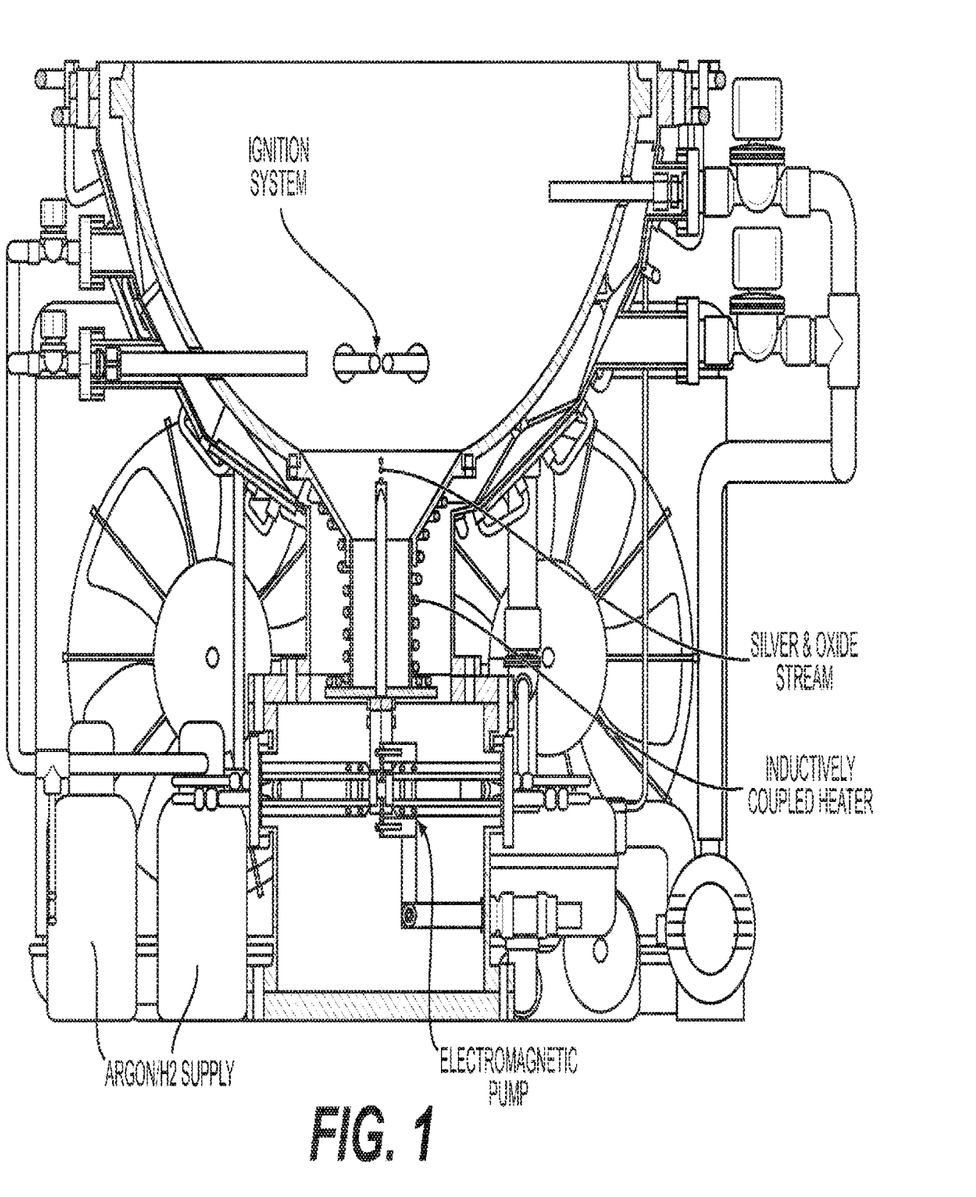
FIG. 1 is a schematic drawing of a SunCell® power in accordance with an embodiment of the present disclosure.

The Solid Fuel Catalyst Induced Hydrino Transition Cell (SF-CIHT; hereinafter "SunCell®") utilized to produce high hydrino reaction power generates an arc current plasma by a 100 us low voltage, high current pulse through a highly conductive matrix of molten silver that is injected into electrodes that provide the plasma-initiating electric pulse. Following ignition, the molten metal returns to the injection system by gravity flow. The hydrino reactants of atomic H and nascent HOH catalyst are formed in the plasma from supplied 3% hydrogen gas in argon flowed at 9 liters per min corresponding to about $2 \times 10^{-4}$ moles $H_2$/s wherein one mole % $Bi_2O_3$, one mole/$LiVO_3$, or 0.5 mole % $LiVO_3$ supplies O for the HOH. The SunCell® shown in FIG. 1 comprises four fundamental systems: (i) a high-temperature thermal insulation covered cylindrical cell body comprising a reservoir containing about 700 g of silver and a 100 cm³ plasma reaction chamber, (ii) an inductively coupled heater to melt the silver wherein the heater antenna comprises ¼" diameter copper tubing that is tightly wrapped around the cell body to provide water cooling in addition to 30 kHz heating power; (iii) an injection system comprising an electromagnetic pump to inject the molten silver and on-the-fly added bismuth oxide; further comprising an electrode electromagnetic pump to force return silver in excess of that which is gaseous and plasma; and (iv) a super capacitor based ignition system to produce the low-voltage, high current flow across the pair of electrodes into which the molten metal and oxide are injected in the presence of hydrogen to form the brilliant light-emitting plasma.

In an exemplary embodiment, the power released by the hydrino reaction caused by the addition of one mole % bismuth oxide ($Bi_2O_3$), one mole % lithium vanadate ($LiVO_3$), or 0.5 mole % lithium vanadate to molten silver injected into ignition electrodes at 2.5 ml/s in the presence of a 97% argon/3% hydrogen atmosphere was measured. The relative change in slope of the temporal reaction cell water coolant temperature before and after the addition of the hydrino reaction power contribution corresponding to the oxide addition was multiplied by the constant initial input power that served as an internal standard. For duplicate runs, the total cell output powers with the hydrino power contribution following oxygen source addition were determined by the products of the ratios of the slopes of the temporal coolant temperature responses of 497, 200, and 26 corresponding to total input powers of 6420 W, 9000 W, and 8790 W. The thermal burst powers were 3.2 MW, 1.8 MW, and 230,000 W, respectively.

Figure 2:
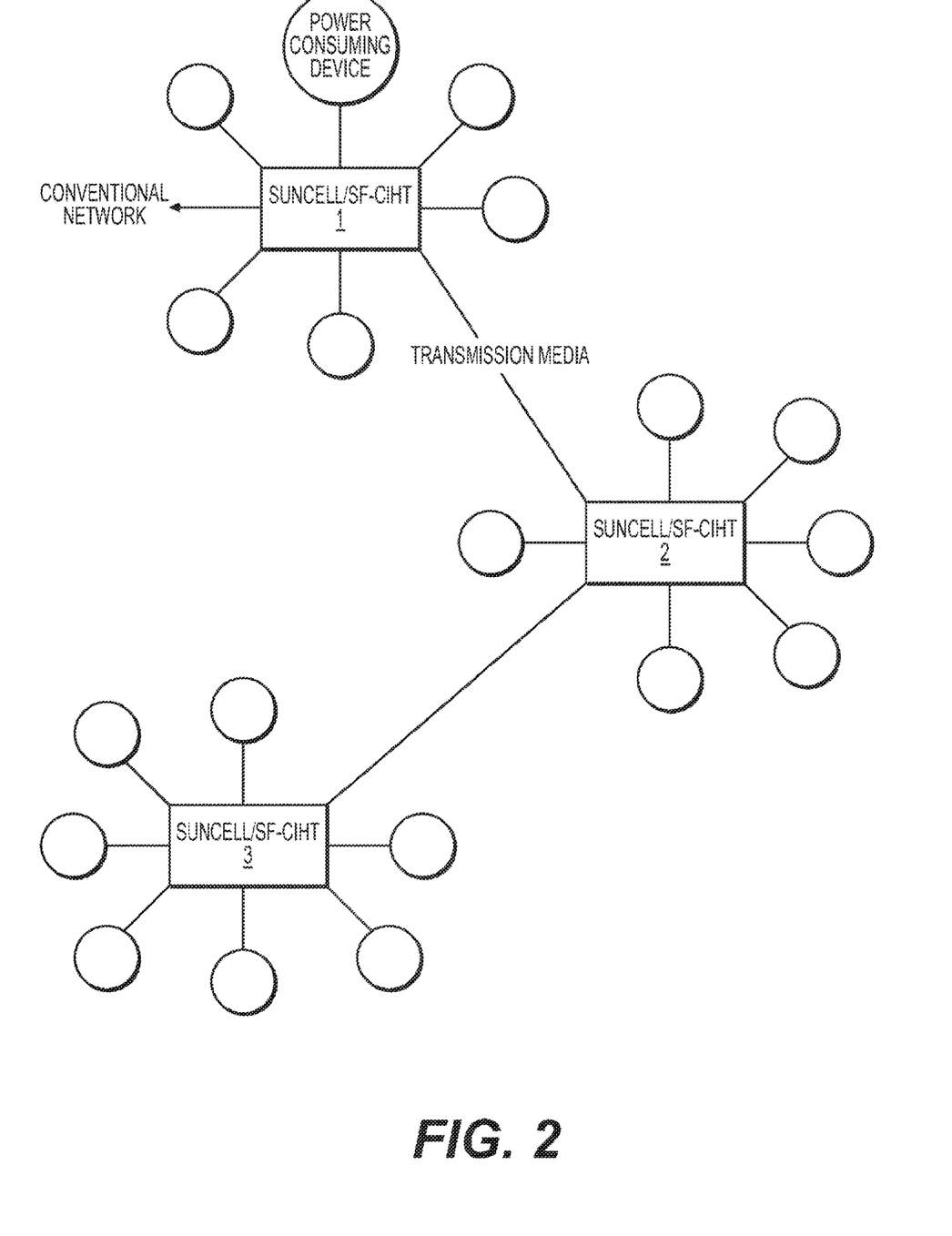
FIG. 2 is a schematic drawing of SunCell® power generators used in a distributed information network in accordance with an embodiment of the present disclosure.

The SunCell® can comprise networking components and can function as a distributed information network. FIG. 2 shows an embodiment using the SunCell® in a distributed information network. In the example, the SunCell® is used to provide power-to-power consuming devices. For example, the SunCell® can be connected to an existing power grid to provide power to devices connected to the grid. Shown in FIG. 2, three SunCells® are physically connected to power consuming devices through power transmission lines, such as wiring capable of transmitting power. The SunCell® are also connected to each other. Connections between SunCell® can use dedicated wiring, wireless transmission, or existing power grid wiring. In the example embodiment, SunCell® 1 is connected to six power consuming devices, SunCell® 2, and has a connection to the convention Internet. SunCell® 2 is also connected to six power consuming devices and to SunCell® 1 and SunCell® 3. SunCell® 3 is connected to seven power consuming devices and to SunCell® 2. In practice, each SunCell® can have any number of power consuming devices connected to it. Each SunCell® can also be connected to any number of other SunCell®, for example in parallel, in a ring structure, serially (as shown in FIG. 2), or there can be no connection to other SunCell®.

In some examples, the power-consuming device is data-sensitive and sends and/or receives data (e.g., smart thermostat, computer, smart light bulb, and the like), and in other examples, the power-consuming device sends no data and simply consumes power (e.g., conventional light bulb). Each SunCell® and each data-sensitive data power consuming device can have a physical and/or logical address. The address is used to identify the device for routing data.

In an embodiment, the SunCell® power generator comprises a power controller that interacts with sensors such as those for input and output parameters such as voltages, currents, and powers. The signals from the sensors may be fed into a processor that controls the power generator. At least one of the ramp-up time, ramp-down time, ignition voltage, ignition current, ignition power, ignition waveform, ignition frequency, fuel flow rate, fuel concentration, operating temperature, and other operating parameters and the output voltage, current, power, waveform, and frequency may be controlled. In an embodiment, the output electricity may be any desired waveform such as DC or AC such as 60 Hz AC or another frequency different from 60 Hz that may comprise a new standard of electrical power. The power generator may comprise an embedded processor and system to provide remote monitoring that may further have the capacity to disable the power generator.

In an embodiment, the generator comprises a communication device capable of remotely sending and receiving information such as data. The communication device may be a smart device such as one having at least some of the capabilities of at least one of a smart phone and a personal computer. The communication device may serve as an external link to at least one of monitor and control the generator. The smart device may further comprise a portal. The portal may facilitate wireless communication to and from the SunCell® generator. In an embodiment, the portal may serve as a means to at least one of transmit and receive internet-type and telecommunications content. The smart device may comprise at least one of a smart phone, a smart tablet, and a personal computer. The internet-like services may be provided via the portal. Exemplary internet-like services comprise GPS, internet connectivity, social media, networking, email, voice or video over IP, search engine capability, and other uses of the internet known to those skilled in the art. The portal of each SunCell® generator may be connected to other such portals to form a network of interconnectivity. The network may serve as an alterative or a parallel internet. Airborne SunCells® such as those in aircraft such as planes and drones may serve as receiver-transmission tower replacements. In an embodiment, signals such as internet content from the SunCell® portal may be transmitted through the building wiring that may be based on DC electricity.

In an embodiment, the SunCell® that may be portable or mobile such as one mounted in a vehicle may be connected to power conditioning equipment such as an inverter to convert DC to AC power. The power conditioning equipment may be used for any application such as auxiliary power. Exemplary auxiliary power uses are vehicle to stationary power such as vehicle to building or plant, and vehicle-to-vehicle such as vehicle to truck, vehicle to train, and vehicle to ship wherein the vehicle providing power such as a car may be carried by the vehicle receiving power. Exemplary carrying vehicles are a truck, train, ship, and plane. In an embodiment, the power conditioning equipment may comprise a reverse car charging station such as the reverse of car charging stations known in the art. In an embodiment, DC power supplied by a mobile SunCell® such as one in a vehicle may be connected to the power conditioning equipment such as one comprising an inverter such as the reverse charging station to supply power to a stationary application such as a building. In an embodiment, the vehicle may comprise a reverse charging station. The vehicle may comprise power conditioning equipment such as an inverter that outputs power suitable for an external load such as a stationary or auxiliary application load. The output from the power conditioner may be connected to the external load by a matching power cord connected to the load. An exemplary cord connection to a load is to the beaker box of a building. In an embodiment, the SunCell® such as one mounted in a vehicle may output DC power to the external load such as a building that may require DC power. The connection may be through the cord. The power transfer may comprise inductive charging using a transmitter on the vehicle and a receiver to receive and supply power to the auxiliary load such as a building. The connection between the power conditioning equipment and the SunCell® may further comprise at least one of a mechanical and an electronic key to control the power flow from the SunCell® to the power conditioning equipment. The control may also be provided by the monitoring and control capability of the unit enabled through the portal. The communication device of each SunCell® may be powered by the corresponding SunCell® or at least another SunCell®. SunCells® may power the network of communication devices. The operational control and power output of a given SunCell® may be controlled through at least one of the individual portals and the network. In an embodiment, at least one of the power output of a given SunCell®, the power output of an aggregate of SunCells®, the power conditioning of any given SunCell®, and the power conditioning of an aggregate of SunCells® may be controlled through at least one of the individual portals and the network.

The connection between the power conditioning equipment and the SunCell® may further comprise at least one of a mechanical and an electronic key to control the power flow from the SunCell® to the power conditioning equipment and load. Remote control may also be provided by the monitoring and control capability enabled through the portal comprising a communication device.

Each SunCell® can comprise a computing system and/or controller and storage media. In an example configuration, the SunCell® can function as a router to route data traffic between devices connected to it and to other SunCell®. In order to route traffic, the SunCell® can maintain in the storage media a configuration table to specify where data packets are routed. The configuration table can include information on which connections lead to particular groups of addresses, priorities for connections to be used, and rules for handling both routine and special cases of traffic. The configuration table can be automatically generated when the SunCell® is connected to the power grid. For example, when a SunCell® is connected to the grid, it can query all devices already connected the grid to send their address and what type of device it is. The SunCell® can transmit this information (e.g., configuration table) with other SunCell® so that each SunCell® knows the address of all devices and the network structure.

Communication between devices and SunCell® can use standard Internet protocols (e.g., TCP/IP), or a proprietary transmission protocol. In some examples, the SunCell® is physically connected to data-sensitive devices using power distribution lines present in the grid. In this way, the SunCell® can communicate using power-line communication (PLC), and no other data transmission media is required. Alternatively, the SunCell® can communicate with devices wirelessly. Each SunCell® can comprise a power-line communication networking interface (e.g., PLC sender/receiver) to connect its communication system to the power distribution system.

In some examples, at least one SunCell® is connected to the conventional Internet. In other examples, the SunCell® networks are standalone. In this way, the SunCell® networks can act as an alternative to the Internet or act in parallel.

What is claimed is:

1. A distributed information network comprising:
a power generating device;
at least one power consuming device;
a power distribution grid connected to the power generating device and the at least one power consuming device;
wherein the power generating device provides power to the power distribution grid; and
wherein the power generating device routes network data traffic using the power distribution grid; and
wherein the power generating device comprises:
a system comprising fuel capable of forming a plasma and generating electrical power from the plasma;
a controller that interacts with sensors to measure data for system performance, input parameters, and output parameters of said system; and
a communication device capable of communication with a second power generating device; wherein said communication involves the transmission of said system performance or output parameters to said second power generating device.

2. The distributed information network according to claim 1, wherein said communication device comprises a power-line carrier transceiver coupled to the controller for transmitting data;
a power distribution connection coupled to the power-line carrier transceiver;
wherein the electrical power and data are simultaneously transmitted through the power distribution connection.

3. The distributed information network according to claim 1, wherein the system comprises:
at least one vessel capable of a maintaining a pressure of below, at, or above atmospheric;
fuel comprising reactants to form the plasma, the reactants comprising:
a) at least one source of nascent $H_2O$;
b) $H_2O$ or at least one source of $H_2O$;

c) atomic hydrogen or at least one source of atomic hydrogen; and
d) a molten metal;
at least one molten metal injection system comprising a molten metal reservoir and an electromagnetic pump; and
at least one additional reactants injection system capable of injecting additional reactants to the molten metal;
at least one reactants ignition system comprising a source of electrical power sufficient to cause the reactants to react to form a plasma when a current is applied to the fuel;
a system to recover the molten metal following ignition; and
at least one power converter or output system of at least one of the light and thermal output to electrical power and/or thermal power.

4. The distributed information network according to claim 3, wherein the molten metal ignition system comprises:
a) at least one set of electrodes to confine the molten metal; and
b) a source of electrical power to deliver a short burst of high-current electrical energy sufficient to cause the reactants to react to form plasma.

5. The distributed information network according to claim 3, wherein the molten metal injection system may comprise an electromagnetic pump comprising at least one magnet providing a magnetic field and current source to provide a vector-crossed current component.

6. The distributed information network according to claim 3, wherein the molten metal reservoir may comprise an inductively coupled heater.

7. The distributed information network according to claim 3, wherein the molten metal ignition system may comprise at least one set of electrodes that are separated to form an open circuit, wherein the open circuit is closed by the injection of the molten metal to cause the high current to flow to achieve ignition.

8. The distributed information network according to claim 3, wherein the circuit of the molten metal ignition system may be closed by metal injection to cause an ignition frequency in the range of 1 Hz to 10,000 Hz, wherein the molten metal comprises at least one of silver, silver-copper alloy, and copper and the additional reactants comprise at least one of $H_2O$ vapor and hydrogen gas.

9. The distributed information network according to claim 3, wherein the additional reactants injection system comprises at least one of a computer, $H_2O$ and $H_2$ pressure sensors, and flow controllers comprising at least one or more of the group of a mass flow controller, a pump, a syringe pump, and a high precision electronically controllable valve; the valve comprising at least one of a needle valve, proportional electronic valve, and stepper motor valve wherein the valve is controlled by the pressure sensor and the computer to maintain at least one of the $H_2O$ and $H_2$ pressure at a desired value.

10. The distributed information network according to claim 3, wherein the system to recover the molten metal following ignition a reservoir in communication with the vessel;
and a cooling system to maintain the reservoir at a lower temperature than another portion of the vessel to cause metal vapor of the molten metal to condense in the reservoir;
wherein the system to recover the molten metal further comprises an electrode electromagnetic pump comprising at least one magnet providing a magnetic field and a vector-crossed ignition current component.

11. The distributed information network according to claim 3, wherein the vessel comprises an inner reaction cell, a top cover comprising a blackbody radiator, and an outer chamber capable of maintaining the pressure of below, at, or above atmospheric,
wherein the top cover comprising a blackbody radiator is maintained at a temperature in the range of 1000 K to 3700 K, and
wherein at least one of the inner reaction cell and top cover comprising a blackbody radiator comprises a refractory metal having a high emissivity.

12. The distributed information network according to claim 3, wherein the light emitted following ignition is predominantly blackbody radiation comprising visible and near infrared light, and the photovoltaic cells are concentrator cells that comprise at least one compound chosen from perovskite, crystalline silicon, germanium, gallium arsenide (GaAs), gallium antimonide (GaSb), indium gallium arsenide (InGaAs), indium gallium arsenide antimonide (InGaAsSb), indium phosphide arsenide antimonide (InPAsSb), InGaP/InGaAs/Ge; InAlGaP/AlGaAs/GaInNAsSb/Ge; GaInP/GaAsP/SiGe; GaInP/GaAsP/Si; GaInP/GaAsP/Ge; GaInP/GaAsP/Si/SiGe; GaInP/GaAs/InGaAs; GaInP/GaAs/GaInNAs; GaInP/GaAs/InGaAs/InGaAs; GaInP/Ga(In)As/InGaAs; GaInP—GaAs-wafer-InGaAs; GaInP—Ga(In)As—Ge; and GaInP-GaInAs-Ge.

13. The distributed information network according to claim 3, wherein the light emitted following ignition is predominantly ultraviolet light, and the photovoltaic cells are concentrator cells that comprise at least one compound chosen from a Group III nitride, GaN, AlN, GaAlN, and InGaN.

14. The distributed information network according to claim 1, wherein the power generating device and the second power generating device are nodes in a mesh network of power generating devices.

15. The distributed information network according to claim 14, wherein said transmission in the mesh network occurs via a flooding algorithm.

16. The distributed information network according to claim 14, further comprising storage media comprising a configuration table to specify where data packets are routed in the mesh network.

17. The distributed information network according to claim 14, wherein said mesh network has a connection to the internet.

18. A method of operating a distributed information network, the method comprising:
providing a power generator comprising a power generating core and a data transmission module;
connecting the power generator to a power transmission grid;
delivering power to the power transmission grid from the power generator;
receiving data from remote devices connected to the power grid using the data transmission module;
routing data traffic between remote devices using the power generator; and
wherein the power generator device comprises
a system comprising fuel capable of forming a plasma and generating electrical power from the plasma;
a controller that interacts with sensors to measure data for system performance, input parameters, and output parameters of said system; and a communication device capable of communication with a second power generating device; wherein said communication involves the transmission of said system performance or output parameters to said second power generating device.

\* \* \* \* \*